(12) United States Patent
Olesen et al.

(10) Patent No.: US 12,196,449 B2
(45) Date of Patent: Jan. 14, 2025

(54) DRYING SYSTEM FOR PRODUCT-AIR HAVING A VERY LOW DEW POINT

(71) Applicant: Torbad APS, Aarhus (DK)

(72) Inventors: Thomas Ronnow Olesen, Aarhus (DK); Rasmus Toftegaard, Marslet (DK); Jesper Lund Jorgensen, Aarhus (DK)

(73) Assignee: Torbad APS, Aarhus (DK)

( * ) Notice: Subject to any disclaimer, the term of this patent is extended or adjusted under 35 U.S.C. 154(b) by 374 days.

(21) Appl. No.: 17/435,729

(22) PCT Filed: Mar. 6, 2020

(86) PCT No.: PCT/EP2020/056055
§ 371 (c)(1),
(2) Date: Sep. 2, 2021

(87) PCT Pub. No.: WO2020/178436
PCT Pub. Date: Sep. 10, 2020

(65) Prior Publication Data
US 2022/0136716 A1    May 5, 2022

(30) Foreign Application Priority Data

Mar. 7, 2019  (DK) .............................. PA201970157

(51) Int. Cl.
*F24F 3/14*    (2006.01)
(52) U.S. Cl.
CPC ................................. *F24F 3/1423* (2013.01)

(58) Field of Classification Search
CPC ..... F24F 2203/01036; F24F 2203/1032; F24F 2203/10; F24F 3/1423; F24F 2203/1036
See application file for complete search history.

(56) References Cited

U.S. PATENT DOCUMENTS

| | | |
|---|---|---|
| 2005/0076781 A1* | 4/2005 | Hess ...................... F24F 3/1411 96/135 |
| 2006/0086120 A1 | 4/2006 | Kashirajima |

FOREIGN PATENT DOCUMENTS

| | | |
|---|---|---|
| EP | 3 431 890 A1 | 1/2019 |
| JP | 11-188224 A | 7/1999 |
| JP | 2000-300935 A | 10/2000 |
| JP | 2001-038137 A | 2/2001 |

(Continued)

OTHER PUBLICATIONS

PCT International Search Report for PCT International Application No. PCT/EP2020/056055.

(Continued)

*Primary Examiner* — Cassey D Bauer
(74) *Attorney, Agent, or Firm* — Olive Law Group, PLLC

(57) ABSTRACT

Herein is detailed a 3-rotor drying system for producing technical air having a very low dew point comprising three rotary desiccant dryers, each rotary desiccant dryer comprising a drying sector and a regeneration sector, the rotary desiccant dryers arranged in sequence and sharing a common regeneration-air flow path for passing regeneration-air through the respective regeneration sectors of the rotary desiccant dryers and a common intake-air flow path for passing intake-air through the respective drying sectors of the rotary desiccant dryers for dehumidifying the intake-air to product-air having a very low dew point.

14 Claims, 7 Drawing Sheets

(56) References Cited

FOREIGN PATENT DOCUMENTS

| | | |
|---|---|---|
| JP | 2010 091130 A | 4/2010 |
| JP | 2011-064439 A | 3/2011 |
| KR | 2011 0000211 A | 1/2011 |
| WO | 2011/161693 A1 | 12/2011 |

OTHER PUBLICATIONS

PCT Written Opinion of the International Searching Authority for PCT International Application No. PCT/EP2020/056055.
Reply to Office Action dated Jan. 7, 2021 for related application Denmark Patent Application No. PA201970157.
Office Action dated Mar. 9, 2020 for related application Denmark Patent Application No. PA201970157.
Office Action dated Aug. 9, 2019 for related application Denmark Patent Application No. PA201970157.

\* cited by examiner

DRYING SYSTEM FOR PRODUCT-AIR HAVING A VERY LOW DEW POINT

CROSS REFERENCE TO RELATED APPLICATIONS

This application is a 35 USC 371 application of International PCT Patent Application No. PCT/EP2020/056055, filed on Mar. 6, 2020, which claims priority to Denmark Patent Application No. PA201970157, filed on Mar. 7, 2019; the contents of which are hereby incorporated by reference herein in their entireties.

TECHNICAL FIELD

Within the field of drying systems, there is a detailed herein a drying system for producing technical air having a very low dew point (i.e. very dry technical air) at reduced energy costs. Such systems are e.g. very suitable for producing conditioned air for very moisture sensitive applications such as clean rooms for lithium battery production or for the production of gasses with very low moisture contents.

BACKGROUND

Within the field of drying systems, there is a detailed herein a drying system for producing technical air having a very low dew point (i.e. very dry technical air) at reduced energy costs. Such systems are e.g. very suitable for producing conditioned air for very moisture sensitive applications such as clean rooms for lithium battery production or for the production of gasses with very low moisture contents.

In the art, it is known to manufacture drying systems for the production of resulting air having a very low dew point, such as dew points below −30° C. or lower. In the art, drying systems are known, which are suitable for producing resulting air having very low dew points. However, in general these systems are not capable of producing technical air, i.e. air in large volumes and at high flowrates for technical purposes, or if useable at all, at reasonable energy or operating costs. Within the present disclosure therefore, technical air encompasses air for purposes such as central air conditioning of buildings, clean rooms or other production facilities, for spray drying towers, fluid bed dryers etc., which for adequate function all rely on high volumes and flowrates of air with well-specified properties. Accordingly, the present invention relates to drying systems for the production of technical air having very low dew points (i.e. very dry technical air), and is discussed in that context herein.

In the context of the present invention, technical air having a very low dew point, shall be understood to mean technical air having a dew point below −30° C., but preferably below −40° C., below −50° C., more preferably below −55° C., and even more preferably below −60° C. In some embodiments of the present invention, the dew point of the resulting product-air may be below −65° C., below −70° C., below −75° C., or below −80° C. In other embodiments, the dew point of the resulting product-air is further above −100° C., further above −95° C., further above −90° C., or further above −85° C. Preferably, the dew points of the product-air of the invention are from −55° C. to −80° C., from −60° C. to −75° C., or from −65° C. to −70° C.

In the art of producing dry technical air, it is well known to make use of drying systems comprising rotary desiccant dryer, also called drying wheels or rotary dryers. An advantage of these systems is their capacity for rapidly dehumidifying large volumes of intake-air, e.g. in excess of 1000 m3/h, for technical purposes. In such drying systems air to be dried passes through a desiccant layer embedded in a rotary wheel, thereby becoming dryer and warmer, whereafter the moist sector of the rotary dryer is passed by rotation to a sector of air-drying and desiccant regeneration and back to an absorption position. Depending on the intake-air, such rotary dryers are capable of producing technical air in large volumes and at high flowrates with a broad range of below 0° C. dew points.

Also in the art of producing technical air having very low dew points such as below −30° C., rotary desiccant dryers have found widespread use, even for providing technical air having dew points below −40° C. or −50° C.

A considerable problem, however, when operating drying systems comprising rotary desiccant dryers for providing technical air at −30° C. or below is the energy cost for operating the drying systems. E.g. within the field of lithium battery production, it is estimated that the primary cost in energy is from operation of various dry rooms that are vital to the quality of the battery cells (Ellingsen et al. J. Industrial Ecology, Vol 18, No 1, pp 113-124).

FIGS. 1, 2A and 2B detail drying systems (10,20) comprising rotary desiccant dryers of the prior art for producing technical air having very low dew points, such as discussed in e.g. WO 2011/161693 to BryAir. The drying systems detailed in FIG. 1 are based on a one-rotor system, whereas the drying systems detailed in FIGS. 2A and B are based on two rotary desiccant dryers in sequence. A particular issue of the prior art drying systems for producing technical air having very low dew points is that these rely on pre-cooling to below the dew point of the intake-air and subsequent drying of the cooled intake-air by the desiccant wheel, a process which is both costly in energy as well as problematic from a hygienic position as condensation water is created, which must be removed before microbial or bacterial contamination can become a risk. In particular, where sterility is an issue, condensation water presents an unwelcome challenge.

For overcoming the problems of the prior art, the present inventors have devised a drying system for producing technical air having very low dew point comprising at least 3 sequentially arranged rotary desiccant dryers, the drying system of the invention having improved energy efficiency while avoiding the production of liquid water and the associated biological contamination risk.

In the art, it has been suggested to arrange in a drying system for producing technical air having a very low dew point, 3 sequential rotary desiccant dryers (c.f. JP 2001038137) for obtaining technical air having a very low dew point of between −90° C. to −110° C., the suggested drying systems comprising a mandatory cooling unit prior to the first rotor, for cooling the intake-air to below the dew point of the same intake-air, wherein regeneration air is recovered after mixing of intake-air with recirculated product-air.

The present system differs from the prior art, amongst other elements, in that regeneration air is recovered prior to mixing of intake-air with recirculated product-air. Thereby regeneration air does not comprise high value product-air, energy is saved, and below dew point cooling of the intake-air prevented.

SUMMARY OF THE INVENTION

According to the invention, there is herein disclosed a 3-rotor drying system (30) for producing technical air having a very low dew point comprising three rotary desiccant dryers (2,21,22), each rotary desiccant dryer (2,21,22) comprising a drying sector (2a,21a,22a) and a regeneration sector (2b,21b,22b), the rotary desiccant dryers (2,21,22) arranged in sequence and sharing a common regeneration-air flow path (9) for passing regeneration-air through the respective regeneration sectors (2a,21b,22b) of the rotary desiccant dryers (2,21,22) and a common intake-air flow path (6,7) for passing intake-air through the respective drying sectors (2a,21a,22a) of the rotary desiccant dryers (2,21,22) for dehumidifying the intake-air to product-air having a very low dew point;

wherein a mixing point (1) for return-air is arranged on the common intake-air flow path (6,7) between a first (2) and a second (21) rotary desiccant dryer, thereby defining a product-air flow path (7) for providing dehumidified product-air having a very low dew point to a location of use (4) downstream from the mixing point (1) for return-air, and where on the product-air flow path (7) the drying sector (2a) of the first rotary desiccant dryer (2) is arranged, and an intake-air flow path (6) upstream from the mixing point (1) for return-air for providing intake-air to the mixing point (1), and where on the intake-air flow path (6) the drying sector (21a) of the second rotary desiccant dryer (21) is arranged;

wherein a splitting point (12) for intake-air is arranged between the mixing point (1) for return-air and the second rotary desiccant dryer (21) on a first section (6a) of the intake-air flow path (6), from which splitting point (12) intake-air is diverged as regeneration-air along the regeneration-air flow path (9);

wherein a purge sector (2c) and the regeneration sector (2b) of the first rotary desiccant dryer (2) are arranged on the regeneration-air flow path (9) such that the regeneration-air via an air flow path (9e) first traverses the purge sector (2c) and subsequently the regeneration sector (2b) via a heater (5) arranged on the regeneration-air flow path (9) between (9b) the purge sector (2c) and the regeneration sector (2b);

wherein the regeneration sector (21b) of the second (21) rotary desiccant dryer is arranged subsequent to the regeneration sector (2) of the first dryer (2) on the regeneration-air flow path (9), and where upstream on the intake-air (6) flow path and downstream on the regeneration-air flow path (9) from the second rotary desiccant dryer (21) is arranged an initial rotary desiccant dryer (22), where on the regeneration-air flow path (9) between (9d) the second (21) and the initial (22) rotary desiccant dryer is arranged an inter-heater (53) for inter-heating regeneration-air prior to traversing the regeneration sector (22b) of the initial rotary desiccant dryer (22);

the 3-rotor drying system (30) further comprising a return-air flow path (8) for providing return-air from a location of use (4) to the mixing point (1) for return air and one or more air moving means.

By the provision of the drying systems (30,40,50) of the invention, technical air a having very low dew point can be provided.

DETAILED DESCRIPTION

Figure 1:
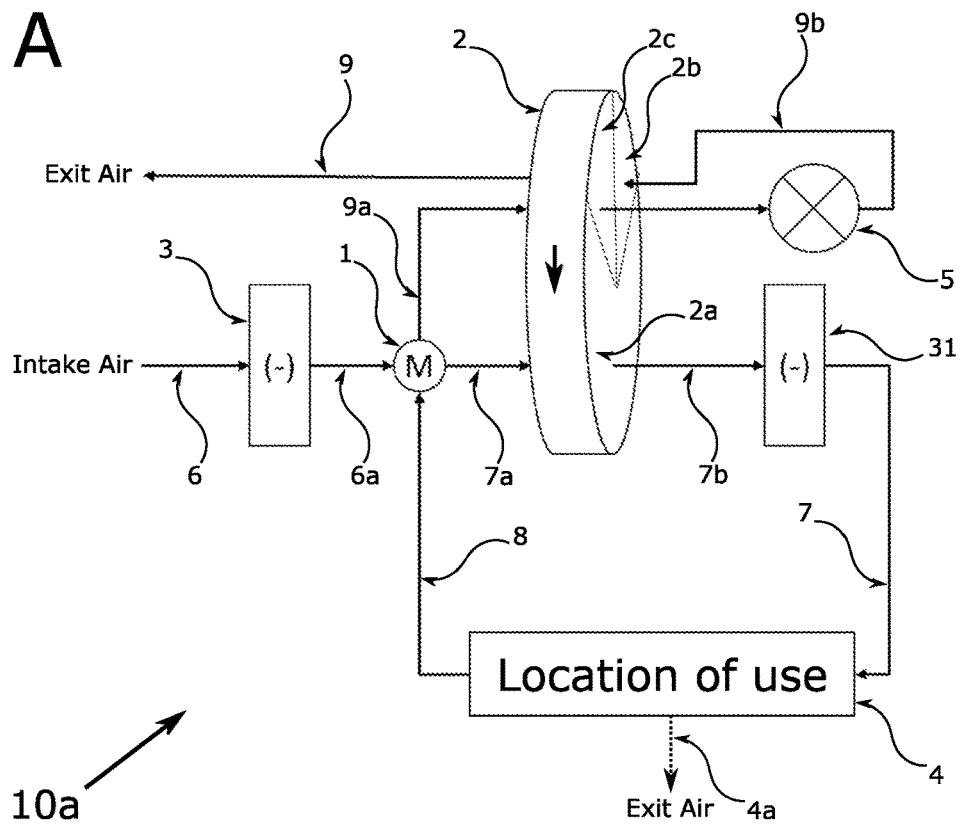
FIG. 1: Prior art 1-rotor drying systems (10a,10b) for producing technical air having very low dew points.
Figure 1:
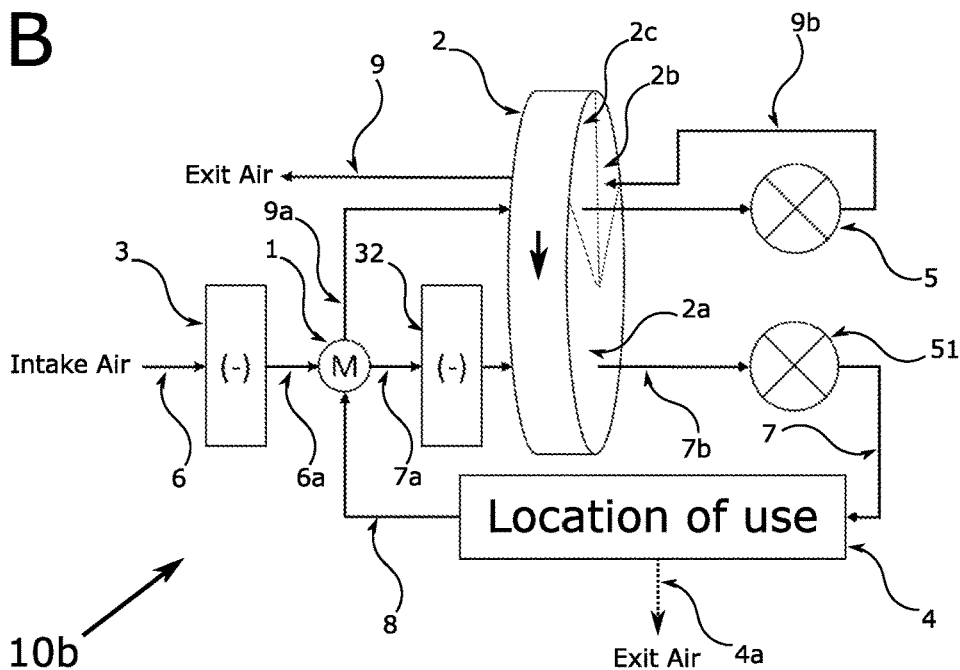

In FIGS. 1A and 1B are detailed two respective 1-rotor drying systems (10a,10b) of the prior art for producing technical air having a very low dew point and supplying the produced air to a location of use (4). Throughout the present disclosure the drying systems of the prior art (10,20) and of the present invention (30,40,50), and hence also the two drying systems (10a,10b) of FIG. 1, are preferably detailed in the context of air conditioning for a room (4) for exemplification of the operating principle behind the systems of the prior art and of the invention. However, it is to be understood, that while the location or space of use (4) of product-air from the drying systems (10,20,30,40,50) generally will be discussed in terms of air-conditioning of rooms, such illustration is solely for the purpose of exemplification and that the drying systems of the invention are suitable for use in numerous other contexts apart from air conditioning, where technical air having very low dew point is desired.

In general, product-air is provided to a location of use (4) via a product-air flow path (7) and may be removed as return-air from the same location of use (4) along a return-air flow path (8) or, optionally, along additional flow path(s) (4a) for exit-air. The location of use (4) thereby does not form part of the drying systems of the present invention (30,40,50).

However, the present invention (30,40,50) and the drying systems of the prior art (10,20) are illustrated in the context of air conditioning of rooms and production facilities in order to illustrate and discuss their advantages and disadvantages with respect to their use in a production line for producing lithium batteries.

The supply of technical air having very low dew point for use in maintaining a very dry, air-conditioned building space, such as a clean room or a production space for the production of lithium batteries, is a particularly important aspect of lithium batteries production with a high propensity for failure, due to lithium's extreme hygroscopic nature and rapid, potentially explosive, combustion when in contact with water. Production specifications on the technical air for use within the production buildings range between dew points of −20° C. down to −60° C. under present standards. Even at these standards, it is estimated that the total production line efficiency is only at about 50%-60% of theoretical maximum, not at least due to difficulties in controlling the humidity of the air in the production buildings and clean rooms.

In order to maintain production of technical air having a very low dew point during use of the produced technical air, the drying systems of the prior art (10a,10b,20a,20b) as well as the drying systems (30,40,50) of the present invention rely on recirculation of most of the dried air between a dehumidifier and the location of use (4), such that during operation only enough ambient air has to enter the drying systems as intake-air in order to compensate for loss of product-air during operation. In the prior art systems (10,20) and in the systems of the invention (30,40,50) intake-air is also leaving as exit-air after having served as regeneration-air for rotary desiccant dryer(s) (2) comprised as dehumidifiers in the drying systems (10,20,30,40,50). Usually, product-air is controllably lost during operation, e.g. by maintaining building space overpressure for preventing entry of contaminants by diffusion. In FIG. 1, this is indicated by the hatched flow path (4a) for exit-air exiting the air-conditioned room (4).

The 1-rotor drying systems (10a,10b) of the prior art are constructed around a mixing point (1) for return-air to which intake-air is provided along an intake-air flow path (6), mixed at the mixing point (1) with return-air provided along a return-air flow path (8) and distributed as mixed-air for product-air dehumidification and desiccant regeneration along flow paths for respectively product-air (7) and regeneration-air (9). The product-air flow path (7), the location of use (4), the return-air flow path (8) and the mixing point (1) under normal operation of the drying systems (10a,10b) of the prior art form a semi-closed loop for air circulation, within which a substantially constant volume flow of air circulates during operation of the drying systems (10).

In order to produce product-air having a very low dew point, i.e. under −30° C., using a 1-rotor drying system (10a,10b) of the prior art, intake-air is first subjected to cooling and condensation of water comprised in the intake-air in a cooling and condensation unit (3) arranged on the intake-air flow path (6) prior to reaching the mixing point (1).

The cooling and condensation unit (3) comprised in the prior art drying systems (10) must be of sufficient cooling and condensation capacity for obtaining intake-air at the mixing point (1) that is sufficiently dry such that when the dry intake-air is mixed with the return-air at the mixing point (1), the mixed-air diverged along the product-air flow path (7) is dry enough for a drying sector (2a) of a rotary desiccant dryer (2) arranged in the product-air flow path (7) between the mixing point (1) and the location of use (4) to remove remaining water in the mixed-air to an extent sufficient for obtaining a given target dew point in the product-air. Experience has shown that for providing a suitable cooling and condensation unit (3) compromises with respect to high operating costs, frequent service and maintenance (and associated production halts), and removal of condensation water from the cooling and condensation unit (3) have to be accepted.

At the mixing point (1) of the prior art dryers (10), the mixed-air, as mentioned, is split into two airflows, one for obtaining product-air by passage along the product-air flow path (7), and one for regeneration-air for passage along the regeneration-air flow path (9). In both flow paths (7,9) there is arranged a shared rotary desiccant wheel (2) comprising a drying sector (2a), a regeneration sector (2b) and a purge sector (2c), wherein the drying sector (2a) is arranged on the product-air flow path (7) such that mixed-air can traverse the desiccant wheel (2) across the drying sector (2a), thereby becoming product-air having a very low dew point, and the regeneration sector (2b) and the purge sector (2c) are arranged on the regeneration-air flow path (9) such that mixed-air can traverse the desiccant wheel (2) firstly at the purge sector (2c) and subsequently at the regeneration sector (2b). Between the purge sector (2c) and the regeneration sector (2b) mixed-air undergoes heating to become regeneration-air in a heater (5) arranged on the regeneration-air flow path (9) between (9b) the purge sector (2c) and the regeneration sector (2b). Thereby the regeneration-air can regenerate the desiccant wheel (2) upon passage of the regeneration sector (2b), whereupon in the 1-rotor dryers (10) of the prior art, the spent regeneration-air is discarded as exit-air. In all figures, where bold arrows are shown on desiccant wheels (2), these indicate an optimal direction of rotation during operation of the drying systems (10a,10b) of the prior art, and hence a preferred direction of rotation. In FIGS. 1A and 1B, the optimal direction of rotation is from drying sector (2a) to regeneration sector (2b) to purge sector (2c).

In the 1-rotor drying systems (10), and after the regeneration-air has traversed the regeneration sector (2b) of the desiccant wheel (2), the regeneration air, which has now become cooled and moist compared to after passage of the heater (5), is discarded as exit-air. A particular problem of the 1-rotor systems (10a,10b) of the prior art, is that while the exit-air has become cooled compared to after heating at the heater (5), the spent regeneration-air is still hot compared to either ambient air or the intake-air for the drying system (10). Typically, temperatures for the regeneration-air after passage of the heater (5) must be within the range of 140° C.-170° C. for obtaining sufficient regeneration of the desiccant wheel (2) in the 1-rotor drying systems (10a,10b), if the product-air obtained after passage of the drying sector (2a) is to meet the required specifications of having a very low dew point. As this leaves the product-air very hot after passage of the drying sector (2a), this has led to the development the two variants (10a,10b) of the 1-rotor drying system (10) for conditioning the product-air prior to use at the location of use (4).

In the first variant 1-rotor drying system (10a), a cooler (31) is arranged on the product-air flow path (7) after passage (7b) of the drying sector (2a); respectively in the second variant 1-rotor drying system (10b), a cooler (32) is arranged between (7a) the mixing point (1) and the drying sector (2a) on the product-air flow path (7) and an inter-heater (51) is arranged on the product-air flow path (7) after passage (7b) of the drying sector (2a). The drying system (10b) and the cooler (32) are often implemented where extra cooling is needed for increasing the efficiency of the desiccant dryer (2). The coolers (31,32) may provide cooling only but may also be coolers and condensers in one unit such as the cooling and condensation unit (3), but this is not required in contrast to the cooling and condensation unit (3) arranged in the intake-air flow path (6).

Further to the above elements, the drying systems (10) comprise (not shown) one or more air moving means, such as pumps, bellows, or fans, which one or more air moving means are arranged in the flow paths (6-9) for moving air in the drying systems according to the needs and uses of the drying system.

Throughout the present disclosure, all drying systems (10,20,30,40,50) and embodiments thereof comprise air moving means such as detailed above. However, in the context of the present disclosure, the person of art is considered capable of applying such air moving means in flow paths for moving air in accordance with his general knowledge, and accordingly the comprised air moving means are not detailed further in the present disclosure.

1-rotor drying systems (10) for production of technical air having a very low dew point are, while being the most expensive to operate, considered less complicated to manufacture and install and therefore enjoy widespread use despite the abovementioned problems. However, for reasons of process economy they are constructed for operation at or close to their limits, which leaves very little room for extra capacity if needed.

Figure 2A:
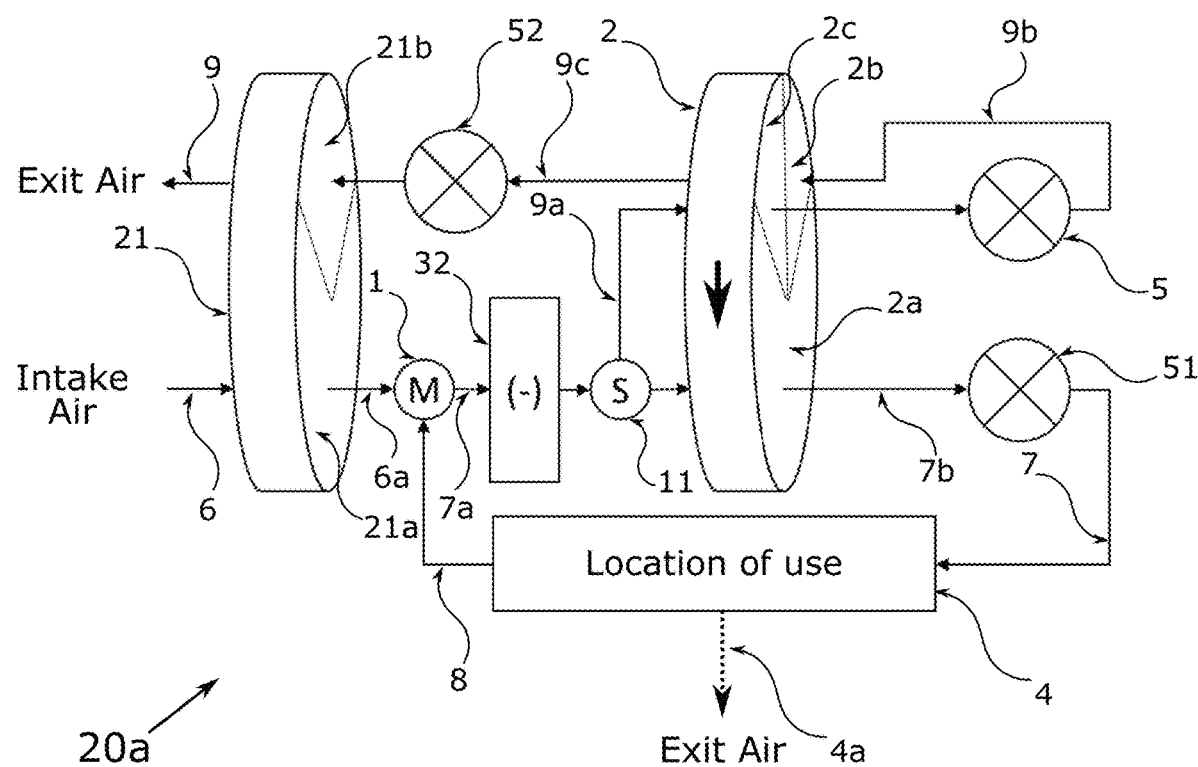
FIG. 2A: Prior art 2-rotor drying system (20a) for producing technical air having very low dew point.
Figure 2B:
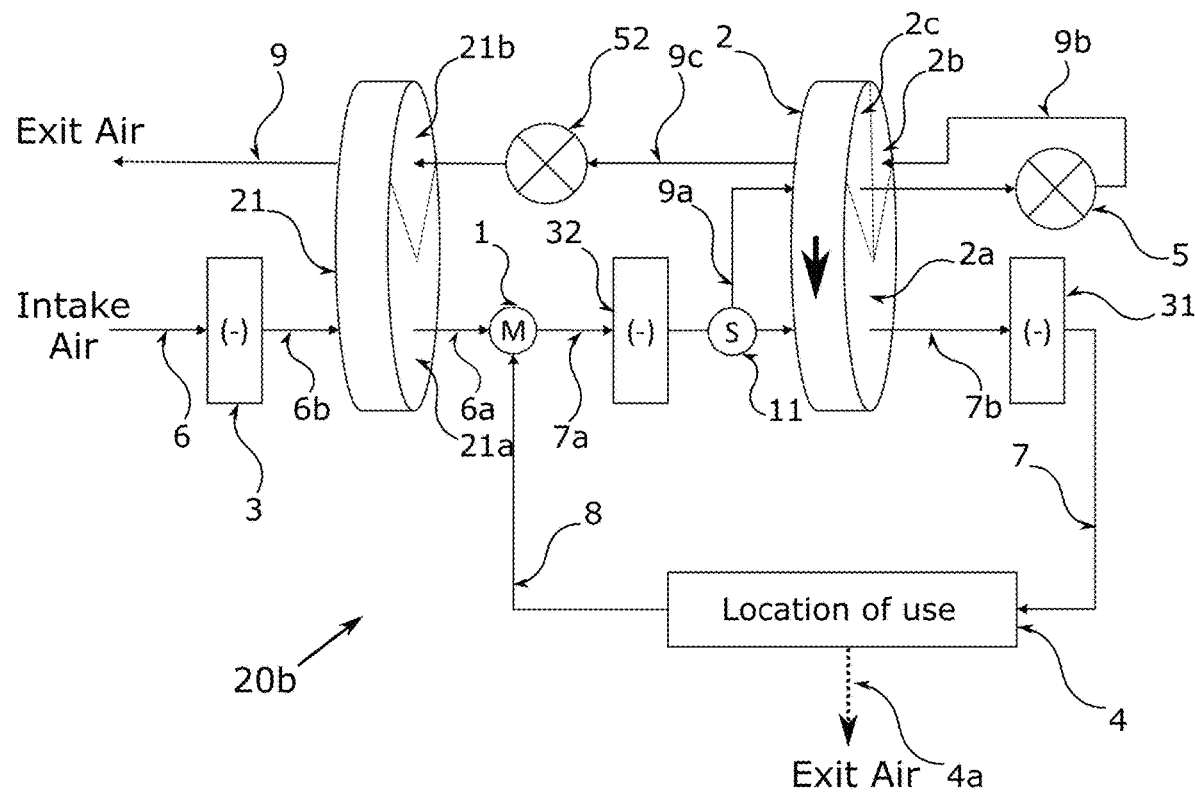
FIG. 2B: Prior art 2-rotor drying system (20b) for producing technical air having very low dew point.

2-rotor drying systems (20) of the prior art, such as shown in FIGS. 2A and 2B, suffer from a number of the same drawbacks as 1-rotor drying system (10) but are also in widespread use. In general their construction is more complicated than for 1-rotor systems, and hence also more expensive, however their operating costs are generally lower and they can be installed with surplus capacity compared to the 1-rotor systems of the prior art.

The 2-rotor drying systems (20a,20b) for producing technical air having very low dew point of the prior art each comprise two rotary desiccant dryers (2,21), each rotary dryer (2,21) comprising a drying sector (2a,21a) and a regeneration sector (2b,21b), with the rotary dryers (2a,21a) arranged in sequence and sharing a common regeneration-air flow path (9) for passing regeneration-air through the respective regeneration sectors (2a,21b) of the rotary dryers (2,21) and a common intake-air flow path (6,7) for passing intake-air through the respective drying sectors (2a,21a) of the rotary dryers (2,21) for dehumidifying the intake-air. A mixing point (1) for return-air is arranged on the common intake-air flow path (6,7) between the two dryers (2,21), thereby defining a product-air flow path (7) for providing dehumidified product-air having a very low dew point to a location of use (4) downstream from the mixing point (1) for return-air, where on the product-air flow path (7) the drying sector (2a) of the first rotary desiccant dryer (2) is arranged; and defining an intake-air flow path (6) upstream from the mixing point (1) for return-air for providing intake-air air to the mixing point (1), where on the intake-air flow path (6) the drying sector (21a) of the second rotary desiccant dryer (21) is arranged. A splitting point (11) for mixed-air is arranged between the mixing point (1) for return-air and the first dryer (2) on a first section (7a) of the product-air flow path (7) upstream from the first dryer (2), from which splitting point (11) mixed-air is diverged as regeneration-air along the regeneration-air flow path (9) via a mixed-air flow path (9a). Between the mixing point (1) and the splitting point (11) a cooler (32) is arranged. A purge sector (2c) and the regeneration sector (2b) of the first dryer (2) are arranged on the regeneration-air flow path (9) such that the regeneration-air first traverses the purge sector (2c) and subsequently the regeneration sector (2b) via a heater (5) arranged on the regeneration-air flow path (9) between (9b) the purge sector (2c) and the regeneration sector (2b). Further, the regeneration sector (21b) of the second dryer (21) is arranged subsequent to the regeneration sector (2) of the first dryer (2) on the regeneration-air flow path (9), and on the regeneration-air flow path (9) between (9c) the first (2) and the second (21) dryer there is arranged an inter-heater (52) for inter-heating regeneration-air prior to traversing the regeneration sector (21b) of the second dryer (21). Further, the 2-rotor drying system of the prior art also comprise a return-air flow path (8) for providing return-air from a location of use (4) to the mixing point (1) for return air and one or more air moving means.

Depending on the circumstances of use, the 2-rotor drying systems (20a,20b) of the prior art may comprise respectively (20a) a heater (51) arranged on the product air flow path (7) downstream (7b) of the first dryer (2) (FIG. 2A) or (20b) a cooler (31) arranged on the product air flow path (7) downstream (7b) of the first dryer (2) (FIG. 2B). In both Figs, additional flow path(s) (4a) for exit-air may be present.

As observed for the 1-rotor drying systems, in use the product-air flow path (7), the location of use (4) and the return-air flow path (8) form a semi-closed loop for air circulation, within which a substantially constant volume flow of air circulates during operation of the drying systems (20). The purpose of the semi-closed loop for air circulation is to reduce the need for fresh intake-air to the amounts needed for system loss, including controlled loss, and rotary dryer regeneration. In general, the circulated return-air will have a dew point, which is close to the target dew point of the drying system (hence is of higher value than the intake-air) and therefore can be recirculated without mandatory treatment prior to mixing with the intake-air at the mixing point (1).

In general, the 2-rotor drying systems of the prior art require intake-air at about 10° C. for use as intake-air, and accordingly cooling is often needed prior to permitting ambient air to serve as intake-air for the prior art drying systems (20). Accordingly, the cooling and condensation unit (3) shown in FIG. 2B arranged upstream on the intake-air flow path (6) to the second dryer (21) is usually present in both systems of the prior art (20a,20b). Regardless thereof, the cooling in cooler (52) of the 2-rotor systems has to be quite intensive in order to increase the efficiency of the desiccant and to provide mixed-air for the purge section (2c) of the first rotary dryer (2), which is sufficiently cooled for compensating for the heating by the regeneration-air leaving the heater (5). The temperature of the regeneration-air after leaving the heater (5) remains high, about 130° C. to 140° C., and also the temperature of the regeneration-air after passage of the inter-heater (52) must remain high, typically above 100° C.

The present invention builds on the above observations by the present inventors for existing installations wherein no adequate balance between installation and operating costs have been found for the drying systems (10,20) currently in use.

It is the aim of the present invention to introduce 3-rotor drying systems (30,40,50) for producing technical air having a very low dew point, such as having a dew point below −30° C., below −40° C., preferably below −50° C., more preferably below −55° C., and even more preferably below −60° C., wherein for the reduced operation costs for the drying systems of the invention, the added cost of installation by using a 3-rotor system can be amortized within a timespan of about 3 years. In some embodiments of the present invention, the dew point of the resulting product-air may be below −65° C., below −70° C., below −75° C., below −80° C., or even below −85° C. These systems are particularly suitable for the subsequent production of technical gasses having a very low moisture content, but the increase in gas quality is at the cost of increase energy consumption for the dehumidification.

The present invention further builds on the observation by the present inventors that it is a common problem of the prior art drying systems (10,20), that to obtain the above 100° C. regeneration-air temperatures of the inter-heater (52), and the above 130° C. regeneration-air temperatures of the heater (5), high exergy sources of heat are needed, such as high power electricity, steam, combustive gas heating, which sources are typically expensive both in installation and operation costs.

Likewise, the present invention further builds on the observation by the present inventors that it is a common problem of the prior art drying systems (10,20), that low-value intake-air is mixed with high-value return-air prior to the final dehumidification in the aforementioned first rotary dryer (2) thereby causing pollution of the air circulating the semi-closed loop for air circulation formed in use by the product-air flow path (7), the location of use (4) and the return-air flow path (8). Thereby the load on the first rotary dryer (2) is increased as more of the high-value return-air is diverted for regeneration-air from the semi-closed loop.

Hence, according to the invention there is herein disclosed:

A 3-rotor drying system (30) for producing technical air having a very low dew point comprising three rotary desiccant dryers (2,21,22), each rotary desiccant dryer (2,21,22) comprising a drying sector (2a,21a,22a) and a regeneration sector (2b,21b,22b), the rotary desiccant dryers (2,21,22) arranged in sequence and sharing a common regeneration-air flow path (9) for passing regeneration-air through the respective regeneration sectors (2a,21b,22b) of the rotary desiccant dryers (2,21,22) and a common intake-air flow path (6,7) for passing intake-air through the respective drying sectors (2a,21a,22a) of the rotary desiccant dryers (2,21,22) for dehumidifying the intake-air to product-air having a very low dew point;
  wherein a mixing point (1) for return-air is arranged on the common intake-air flow path (6,7) between a first (2) and a second (21) rotary desiccant dryer, thereby defining
    a product-air flow path (7) for providing dehumidified product-air having a very low dew point to a location of use (4) downstream from the mixing point (1) for return-air, and where on the product-air flow path (7) the drying sector (2a) of the first rotary desiccant dryer (2) is arranged, and
    an intake-air flow path (6) upstream from the mixing point (1) for return-air for providing intake-air to the mixing point (1), and where on the intake-air flow path (6) the drying sector (21a) of the second rotary desiccant dryer (21) is arranged;
  wherein a splitting point (12) for intake-air is arranged between the mixing point (1) for return-air and the second rotary desiccant dryer (21) on a first section (6a) of the intake-air flow path (6), from which splitting point (12) intake-air is diverged as regeneration-air along the regeneration-air flow path (9);
  wherein a purge sector (2c) and the regeneration sector (2b) of the first rotary desiccant dryer (2) are arranged on the regeneration-air flow path (9) such that the regeneration-air via an air flow path (9e) first traverses the purge sector (2c) and subsequently the regeneration sector (2b) via a heater (5) arranged on the regeneration-air flow path (9) between (9b) the purge sector (2c) and the regeneration sector (2b);
  wherein the regeneration sector (21b) of the second (21) rotary desiccant dryer is arranged subsequent to the regeneration sector (2) of the first dryer (2) on the regeneration-air flow path (9), and
  where upstream on the intake-air (6) flow path and downstream on the regeneration-air flow path (9) from the second rotary desiccant dryer (21) is arranged an initial rotary desiccant dryer (22), where on the regeneration-air flow path (9) between (9d) the second (21) and the initial (22) rotary desiccant dryer is arranged an inter-heater (53) for inter-heating regeneration-air prior to traversing the regeneration sector (22b) of the initial rotary desiccant dryer (22);
  the 3-rotor drying system (30) further comprising a return-air flow path (8) for providing return-air from a location of use (4) to the mixing point (1) for return air and one or more air moving means.

It is a particular advantage of the drying systems (30,40, 50) of the invention that they can be operated without comprising coolers, in particular without comprising cooling and condensation units, yet still provide product-air having a very low dew point, e.g. below −30° C.

The underlying reason is in part that the present invention overcomes the problem of regeneration-air pollution of the air circulating the semi-closed loop for air circulation formed in use by the product-air flow path (7), the location of use (4) and the return-air flow path (8) by diverging the regeneration-air prior to the mixing point (1) for return-air but also that most of the humidity is removed by the initial rotary desiccant dryer (22) at low cost before the intake-air has undergone further process steps, and wherein the exit-air comprising the largest moisture content is removed at the last station in the drying process.

In a preferred embodiment, the initial rotary desiccant dryer (22) removes at least 90% by weight of the initial moisture content comprised in the intake-air, removes at least 95% by weight, at least 96% by weight, at least 97% by weight, at least 98% by weight, or preferably at least 98.5% by weight of the initial moisture content comprised in the intake-air.

Figure 3:
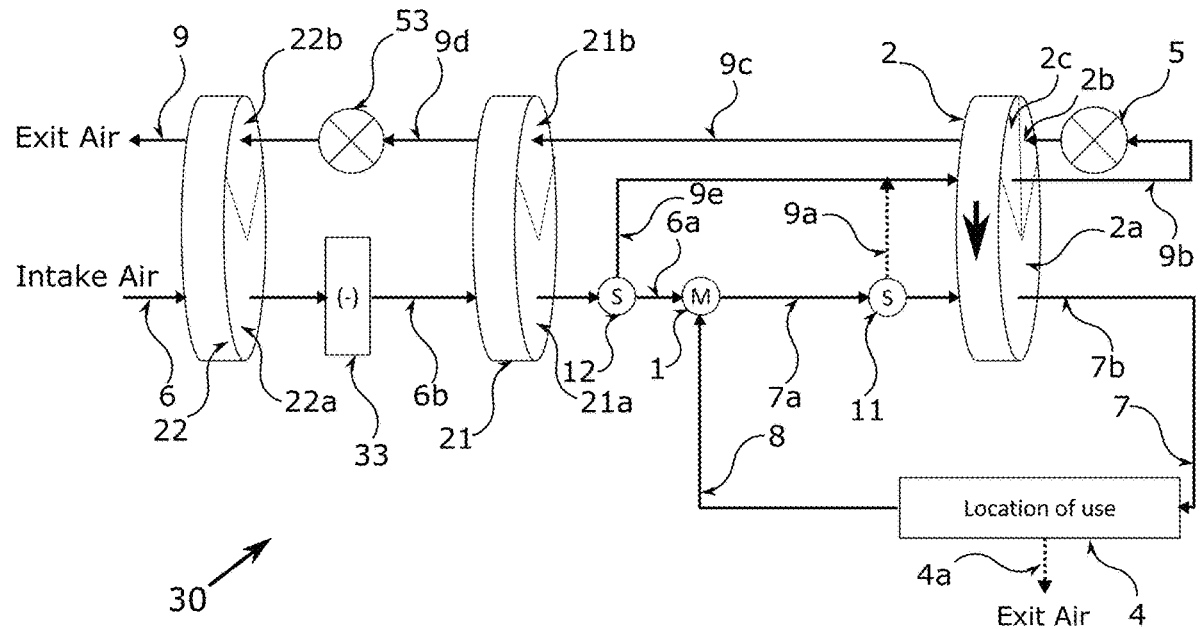
FIG. 3: Exemplary 3-rotor drying systems (30) of the invention.

However, for obtaining product-air having the lowest dew points, such as e.g. below −50° C., cooling may be necessary, both for product-air quality and for air conditioning if the location of use (4) is a room or a building space for human use. In FIG. 3, preferred embodiments of the 3-rotor drying system (30) of the invention comprising a cooler (33) are exemplified.

In accordance with one embodiment of the invention, the 3-rotor drying system (30) further comprises a cooler (33) arranged on the intake-air flow path (6) between (6b) the second (21) and the initial (22) rotary desiccant dryers. In the examples below we present simulation values for a 3-rotor drying system (30) of the invention implementing the embodiment comprising a cooler (33) and comparative data for corresponding embodiments of the prior art (10a, 20b).

A particular advantage of the embodiment further comprising a cooler (33) is that since the majority of the initial moisture content has been removed from the intake-air by adsorption in the initial rotary dryer the cooler (33) only needs to provide low intensity cooling, such as cooling from below 60° C., from below 55° C., from below 50° C., from below 45° C., from below 40° C., or from below 35° C. and down to room temperature, such as e.g. between 15° C. to 25° C. or 20° C.

Particularly, it is an advantage of the present invention that it does not require pre-cooled intake-air for efficient production of technical air having a very low dew point. The prior art drying systems (10,20) generally require pre-cooled intake-air, which in accordance with the standards of the business has been cooled to 10° C. before entering the drying systems of the prior art. The drying systems (30,40, 50) of the present invention are functional even, when the intake-air is at ambient temperature. However, in preferred embodiments of the invention, the drying systems (30,40, 50) of the invention comprises a pre-cooler (3) for cooling intake-air to close to the dew point of the intake-air, such as for cooling intake-air to 15% above the dew point of the intake-air, to 10% above the dew point of the intake-air, or to 5% above the dew point of the intake-air, based on difference in degrees Celsius.

Likewise, it is a particular advantage of the present drying systems (30,40,50) of the invention that the intake-air volume can be reduced compared to the drying systems (10,20) of the prior art when the same target dew point is contemplated for product-air for a given location of use (4).

In Example 2 the situation is shown where for same volume flows, the improvement to the dew point by using the drying systems (30,40,50) of the invention is between 6-8° C., and accordingly, by lowering the volume flows in the systems of the present invention, some of this beneficial difference in dew point can be used to lower volume flows and hence increase the economic benefits of the drying systems of the invention compared to the prior art.

As the temperature after passage of the cooler (33) is not significantly increased by passage of the further two rotary desiccant dryers (2,21), further cooling or heating for controlling the temperature of the final product-air prior to entry to a location of use (4) such as a room or a building space can, in general, be dispensed with.

In an embodiment of the invention, the 3-rotor drying system (30) further comprises a splitting point (11) for mixed-air arranged between the mixing point (1) for return-air and the first rotary desiccant dryer (2) on a first section (7a) of the product-air flow path (7) upstream from the first rotary desiccant dryer (2), from which splitting point (11) mixed-air is diverged as regeneration-air along the regeneration-air flow path (9) via a mixed-air flow path (9a).

As can be observed from FIG. 3, when a splitting point (12) in accordance with the invention is provided, the semi-closed loop for circulating air can in fact be a closed loop. Accordingly, and to prevent pressure buildup in a location of use (4), the location of use (4) must either comprise a flow path (4a) for exit air or surplus circulation air can be used for regeneration air by diverging the surplus circulation air at the splitting point (11) for mixed-air along the mixed-air flow path (9a) connecting to an air-flow path (9e) of the regeneration-air flow path (9) prior to regeneration-air passage of the purge sector (2c) of the first rotary desiccant dryer (2).

In some embodiments of the present invention, the splitting point (11) for mixed-air may replace the splitting point (12) for intake-air in the drying systems (30,40,50) of the invention. Thereby it becomes possible e.g. to improve existing 2-rotor drying systems by adding the initial rotary desiccant dryer (22) arranged as detailed herein. The variant system of the invention, however, will be less efficient than the preferred systems (30,40,50) of the invention detailed herein.

Figure 4:
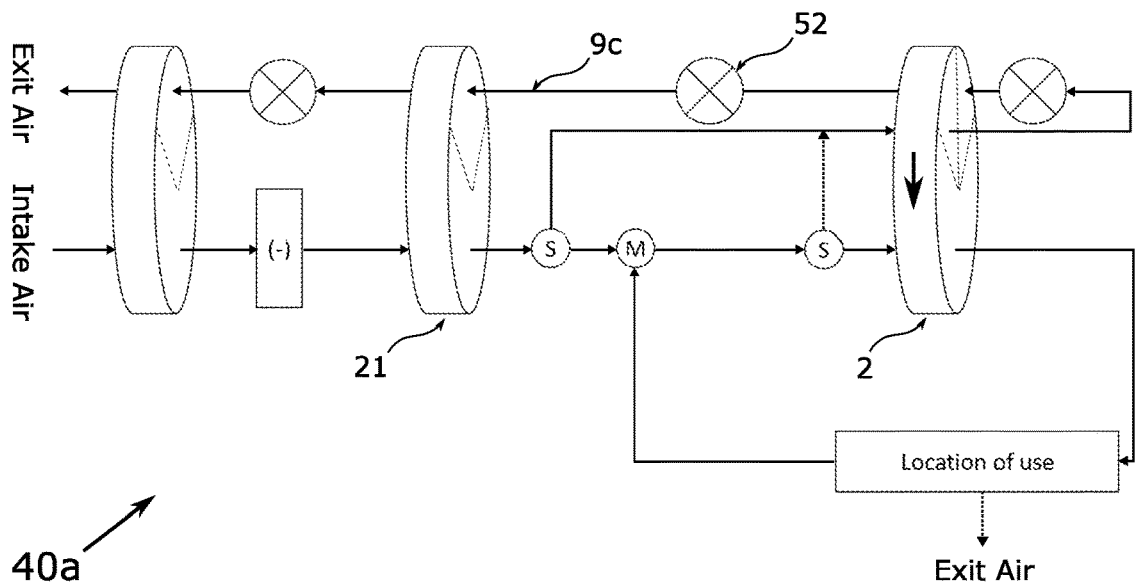
FIG. 4: Exemplary 3-rotor drying systems (40a,40b) of the invention.
Figure 4:
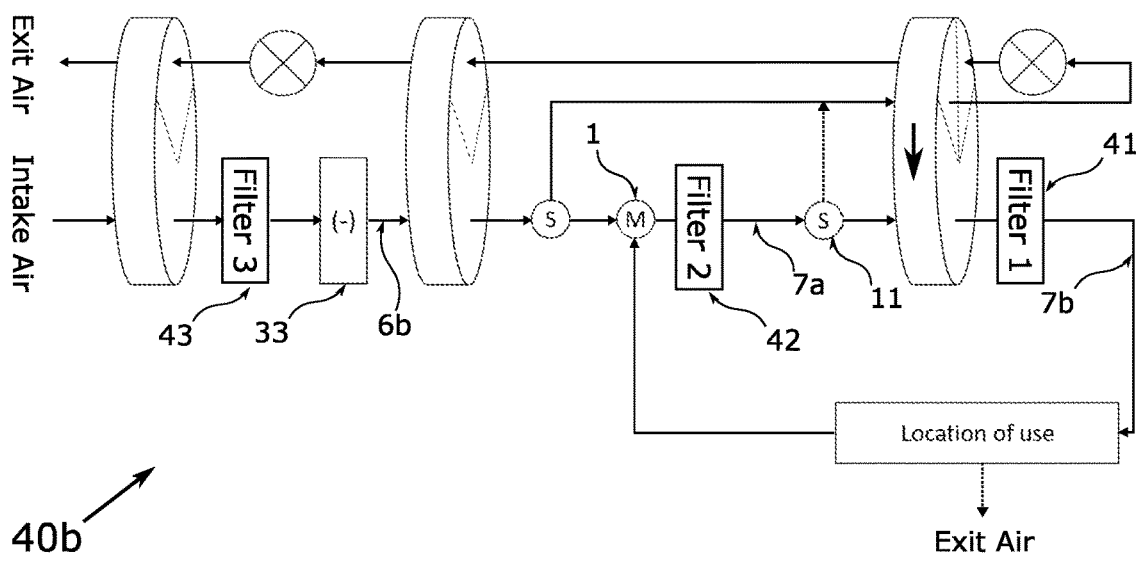

In an embodiment of the invention, the 3-rotor drying system (40a) further comprises an inter-heater (52) for inter-heating regeneration-air prior to traversing the regeneration sector (21b) of the second rotary desiccant dryer (21) arranged on the regeneration-air flow path (9) between (9c) the first (2) and the second (21) rotary desiccant dryers. An exemplary embodiment (40a) thereof is detailed in FIG. 4A.

In general, the regeneration-air leaving the regeneration sector (2b) of the first rotary desiccant dryer (2) remains hot and very dry, even after regenerating the first rotary dryer (2), and under normal operation, it is not necessary to provide an inter-heater between the first (2) and second (21) rotary dryers, however, where operation is intended to approach the limits of the drying systems (40a) of the invention, providing the mentioned inter-heater (52) can be particularly beneficial.

In some embodiments of the invention, the inter-heater (52) may replace the inter-heater (53) arranged between the second (21) and the initial (22) rotary desiccant dryer. Thereby it becomes possible e.g. to improve existing 2-rotor drying systems by adding the initial rotary desiccant dryer (22) arranged as detailed herein. The variant system of the invention, however, will be less efficient than the preferred systems (30,40,50) of the invention detailed herein.

In an embodiment of the invention, the 3-rotor drying system (40b) further comprises at least one filter (41-43) arranged on the common intake-air flow path (6,7) for removing airborne particles from the intake-air. In the exemplary and preferred embodiment (40b) of the invention detailed in FIG. 4B, the drying system (40b) of the invention comprises at least three filters (41-43), each respective filter arranged downstream from a preceding respective rotary desiccant dryer (2,21,22) in ascending order of filter class. In general, it is considered that it is within the skills of the person in the art to provide filtered product-air to a location of use (4) in response to a given technical specification. In a particularly preferred embodiment (40b), filter 3 (43) is a class F6 filter, filter 2 (42) is a filter selected from filter classes F6 to F9, and filter 1 (41) is a class F9 filter. In embodiments of the present drying systems (40b) for locations of use (4) requiring particularly low particle classes, a HEPA-filter is arranged downstream from filter 1 (41).

In an embodiment of the invention, the 3-rotor drying system (50) further comprises a cooler (32) arranged on the product-air flow path (7) prior to the first rotary desiccant dryer (2).

Figure 5:
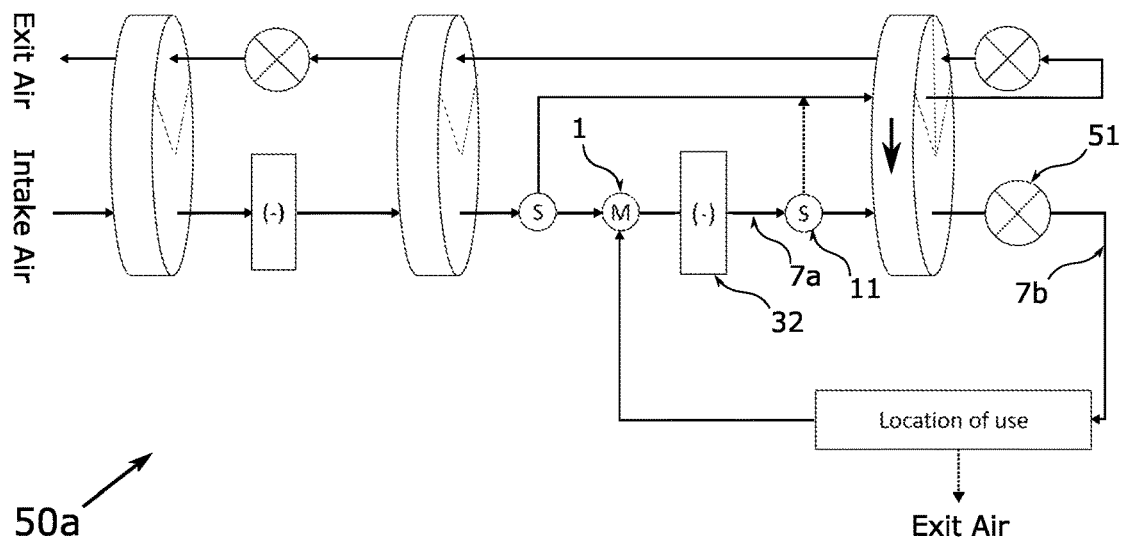
FIG. 5: Exemplary 3-rotor drying systems (50a,50b) of the invention.
Figure 5:
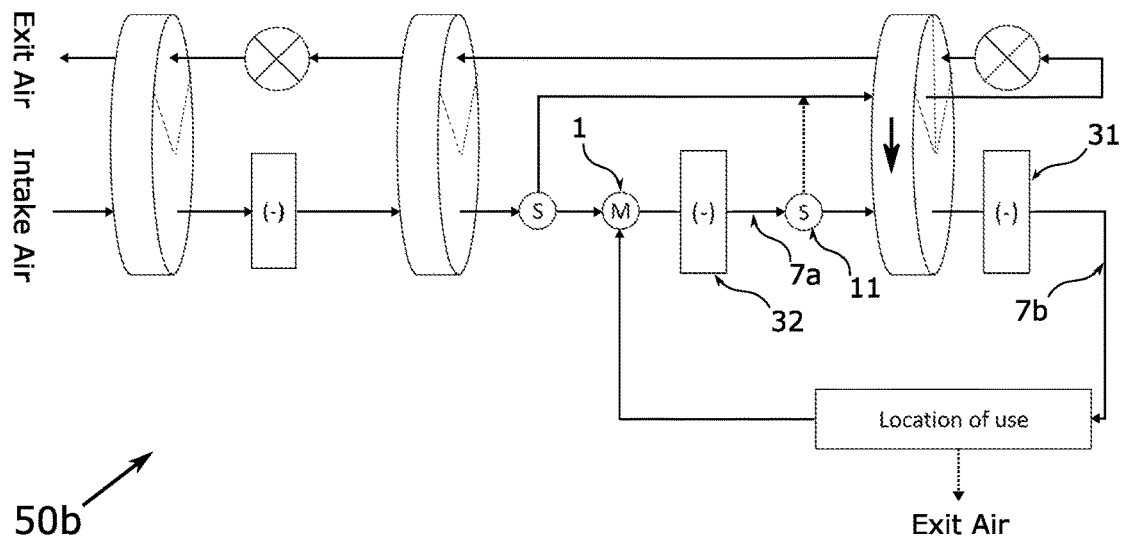

In an embodiment of the invention, the 3-rotor drying system (50a) further comprises an inter-heater (51) arranged on the product-air flow path (7) downstream (7b) of the first rotary desiccant dryer (2) (cf. FIG. 5A). In another embodiment of the invention, the 3-rotor drying system (50a) further comprises a cooler (31) arranged on the product-air flow path (7) downstream (7b) of the first rotary desiccant dryer (2) (cf. FIG. 5B). Thereby, and in accordance with the prior art, the product-air supplied to the location of use (4) can be air-conditioned prior to use, which is particularly suitable for use of the product-air in building spaces and rooms, such as clean rooms.

In accordance with current standards for rotary desiccant dryers of the art, the desiccants comprised in the desiccant wheels can be silica gels, zeolites, activated alumina or likes, or any combinations thereof. Preferred, the rotary desiccant dryers (2,21,22) for use with the invention comprise desiccants selected from silica gels, zeolites or combinations thereof, and particularly preferred are silica gels. Calculations presented herein below are based on rotary desiccant wheels comprising silica gels.

The intake-air can be ambient air; however, it is preferable that the intake-air is pretreated ambient air, which has been pretreated to remove e.g. particles of dust, microbial or bacteriological contaminants etc. In some embodiments of the present invention, the drying systems (30,40,50) of the invention may comprise means for pretreating air to provide intake-air arranged on the intake-air flow path (6) prior to the initial rotary desiccant dryer (22).

EXAMPLES

For documenting the performance of the drying system (30) of the invention in its broadest aspect, we have simulated the overall performance of the present drying system (30) with 1 1-rotor and 2-rotor drying systems of the prior art, where in the simulations, the sizes of the rotors were kept constant between respective drying systems. Likewise, the intake-air volume flow and the target product-air volume flow were kept constant.

The simulations were based on calculations of dynamic mass and heat transfer between air and the rotor material, where in the calculations desiccant sorption isotherms, dynamic heat and mass transfer are taken into account as well as experimentally determined parameters and input data proprietary to the simulation tool producers. For consistency, we tested on two different simulation tools from two different producers. The simulations were considered convergent, if the resulting data after 6-8 iterations did not diverge more than the one standard variation between two consecutive iterations.

The results of the simulations are shown in Example 1 and FIG. 6 and in Example 2 and Table 1 below.

Example 1

Using standard intake-air specifications for 1-rotor and 2-rotor systems of 4300 m³/h, 10° C. @ 90% RH (7.6 g/kg H₂O) for exchanging 1300 m³/h of air to a semi-closed loop circulating 30,000 m³/h, wherein the product-air has a very low dew point of −68° C. after passage of the last rotary dryer (2), the simulation of the drying system (30) of the present invention in its broadest aspect, shows (cf. FIG. 6) that it is not necessary to heat beyond 73° C. nor to cool below 10° C. at any point in the drying system (30). In fact, the air leaving the cooler (33) is not heated by more than 1.1° C. in the further two (2,21) rotary dryers and hence is suitable for air-conditioning of a location of use (4), when the location of use (4) is e.g. a clean room or a building space for lithium battery production.

It is a particular advantage of the drying systems (30,40, 50) of the present invention that only low temperature heating is required for regenerating the first rotary dryer (2), seldom above 75° C. Thereby the system can utilize sources of low heat for regeneration, such as heated water from other local heating, solar energy, district heating etc.

A further and significant, advantage of the increased air temperature of the intake-air is that problems of water condensation, heat/cold loss, thermal bridges to the exterior are significantly minimized by being able to operate the drying systems (30,40,50) of the invention at about room temperature. This further provides for savings in the construction of the cabinet for the drying systems, as less insulation will be needed for maintaining desired operation temperatures.

Example 2—Comparative

Using the above specifications, but using a more realistic production flow rate of air of 48,000 m³/h as intake-air, a comparative study between a 1-rotor drying system (10a), a 2-rotor drying system (20a) and the drying system of the present invention in its broadest aspect (30). The results are reported below in Table 1:

As can be observed from the comparative data, the 3-rotor solution of the invention is more cost efficient over the 1-rotor already after two years, and more cost efficient over both the 1-rotor and the 2-rotor drying systems already after 3 years, while providing product-air having a lower dew point compared to the 1-rotor and 2-rotor drying systems by between 6-8° C.

This extra capacity with respect to dew point can be used, not just for minimizing quality problems of the product-air at the intended location of use (4) but also, if the intended location of use (4) is a production space for lithium batteries, provide increase mitigation of explosion risks at the production space for the batteries. As discussed above, it can also be used for reducing the total flow volume of air through the drying systems of the invention.

TABLE 1

| Comparative Results | | | |
|---|---|---|---|
| System | 1-rotor | 2-rotor | 3-rotor |
| Air flow | 48,000 m³/h | 48,000 m³/h | 48,000 m³/h |
| Dew point of product-air | −55° C. | −57° C. | −63° C. |
| Energy consumption | 113 kW | 80 kW | 37 kW |
| Amperes | 164 A | 116 A | 54 A |
| Cost to install (index) | 100 | 109.6 | 112.5 |
| Cost after 1 year (index) | 270.5 | 288.1 | 318.0 |
| Cost after 2 year (index) | 341.2 | 338.0 | 341.3 |
| Cost after 3 year (index) | 411.8 | 388.0 | 364.4 |

Example 3—Comparative to JP 2001038137

For comparison, the present setup was measured against the 3-rotor system of JP 2001038137 using the simulation parameters as detailed for Examples 1 and 2, with the aim of investigating the effect of the placement of the mixing point (1) for return-air with intake-air relative to the splitting point (12) for regeneration air in the two different systems, i.e. investigating the effect of diverging regeneration air prior to or after the mixing point (1).

A problem of such a comparison is that the present systems (30,40,50) and the prior art systems are not initially configured for providing identical product-air and therefore some adaptations have to be made for performing a comparison. In particular, the 3-rotor system of JP 2001038137 comprises a pre-cooler (3) for below dew point cooling, which is not present in the systems of the invention, where—if pre-cooling is used at all—pre-cooling is never to below the dew point of the intake-air. Hence, the below comparison is not a direct comparison of the present system with the prior art systems, but merely explores the effect of the position of the mixing point (1) on the present 3-rotor systems.

The present simulation therefore implements all features detailed in JP 2001038137 (except where, as detailed, no pre-cooling is implemented), i.e. coolers (33) and (32), and all heaters (5,52,53).

As discussed, the present system is operative also without cooler (32), which is not the case for the system disclosed in JP 2001038137. Likewise, the present system is suitable for use also without heater (52), both of which differences provides for reduced cost of operation and investment for obtaining product-air of a suitable quality (c.f. e.g. FIG. 6)

The present comparison compares the two systems, wherein no pre-cooling of the intake-air is performed, in keeping with the intentions of the present invention, and wherein pre-cooling to within 5% of the dew point of the pre-cooled intake-air is performed.

Under these conditions, the resulting product-air obtained using a 3-rotor system differing by the two positions of the mixing point (1) compare as:

TABLE 2

| Product-air characteristics - No pre-cooling | | |
|---|---|---|
| | Split (12) - Mix (1) Present 3-rotor system | Mix (1) - Split (12) Adapted Prior Art 3-rotor |
| T [° C.] | 18.5 | 18.5 |
| Dew Point [° C.] | −69.3 | −68.1 |

TABLE 2-continued

Product-air characteristics - No pre-cooling

|  | Split (12) - Mix (1)<br>Present 3-rotor system | Mix (1) - Split (12)<br>Adapted Prior Art 3-rotor |
|---|---|---|
| $H_2O$ [g/kg] | 0.0018 | 0.0022 |
| Total Energy [kW] | 243.4 | 255.9 |
| Heating [kW] | 67.6 | 68.2 |
| Cooling [kW] | 138.5 | 146.9 |
| Electric [kW] | 37.3 | 40.8 |

As can be seen from the simulation results, the resulting product-air has better specifications compared to the adapted prior art rotor under the same simulation conditions, and further the total energy spent is lower by 12.5 kW.

TABLE 3

Product-air characteristics - Pre-cooling

|  | Split (12) - Mix (1)<br>Present 3-rotor system | Mix (1) - Split (12)<br>Adapted Prior Art 3-rotor |
|---|---|---|
| T [° C.] | 18.5 | 18.5 |
| Dew Point [° C.] | −69.2 | −68.0 |
| $H_2O$ [g/kg] | 0.0018 | 0.0022 |
| Total Energy [kW] | 164.3 | 163.6 |
| Heating [kW] | 65.9 | 61.9 |
| Cooling [kW] | 61.1 | 60.9 |
| Electric [kW] | 37.3 | 40.8 |

As can be seen from the simulation results, the resulting product-air has better specifications compared to the adapted prior art rotor under the same simulation conditions, whereas the total energy spent is slightly higher by 0.7 kW.

This additional energy expenditure is an artefact of the particular simulation constraints. In the presented simulations, it is assumed that the return-air has a return temperature of 24° C. after passage of the location of use (4), which results in a slightly lowered energy consumption for heating the regeneration air in the adapted prior art 3-rotor system. But if the temperature after passage of the location of use (4) is lower, e.g. 20-22° C. (usually the case for comfort), the energy spent for heating in the adapted 3-rotor system of the prior art will be on par or slightly higher than the 3-rotor systems of the present inventions.

Consistently, in both simulations, 10% less energy is needed for transporting air through the 3-rotor system of the present invention compared to the adapted 3-rotor system of the prior art, which is a consistent result and independent on the air composition of the intake-air, such as e.g. initial moisture content of the intake-air, which influences parameters such as energy spent for heating and cooling.

Figure 6:
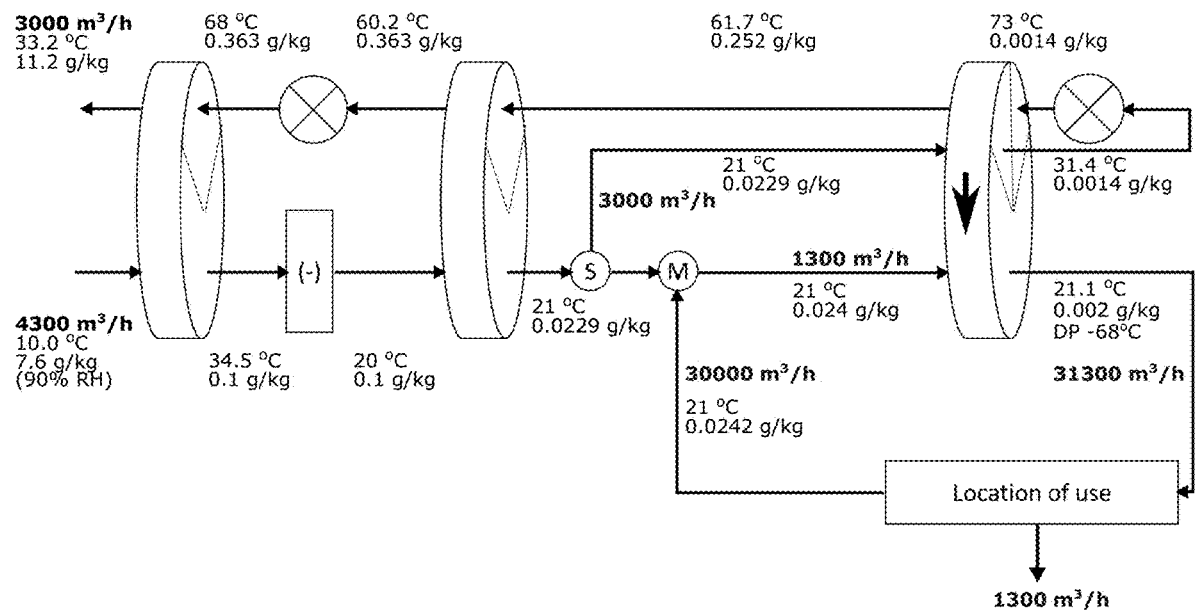
FIG. 6: Simulation of efficiency of a 3-rotor drying system (30) of the invention.

Notably, however, which is the predominant advantage of the present invention is, that the systems of the present invention implementing only pre-cooler (3), cooler (33) and heaters (5,53) is suitable for providing product-air of a high quality, even having the same quality as the adapted prior art system of JP 2001038137 implementing also cooler (32) and heater (52), compare the simulation results of FIG. 6 with the data of Tables 2 and 3, hence documenting that the systems of the present invention can be implemented with reduced cost of operation and investment for obtaining product-air of a suitable high quality.

CLOSING COMMENTS

The term "comprising" as used in the claims does not exclude other elements or steps. The term "a" or "an" as used in the claims does not exclude a plurality. Although the present invention has been described in detail for purpose of illustration, it is understood that such detail is solely for that purpose, and variations can be made therein by those skilled in the art without departing from the scope of the invention.

The invention claimed is:

1. A 3-rotor drying system for producing technical air having a dew point below −30° C. comprising a first, a second, and a third rotary desiccant dryers, each rotary desiccant dryer comprising a drying sector and a regeneration sector, the rotary desiccant dryers arranged in sequence and sharing a common regeneration-air flow path for passing regeneration-air through the respective regeneration sectors of the rotary desiccant dryers and a common intake-air flow path for passing intake-air through the respective drying sectors of the rotary desiccant dryers for dehumidifying the intake-air to product-air having a very low dew point;

wherein a mixing point for return-air from a location of use is arranged on the common intake-air flow path between the first and the second rotary desiccant dryer, thereby defining:

a product-air flow path for providing dehumidified product-air having a very low dew point to the location of use downstream from the mixing point for return-air, and where on the product-air flow path the drying sector of the first rotary desiccant dryer is arranged, and a first section of the common intake-air flow path upstream from the mixing point for return-air for providing intake-air to the mixing point, and where on the first section of the common intake-air flow path the drying sector of the second rotary desiccant dryer is arranged;

wherein a splitting point for intake-air is arranged between the mixing point for return-air and the second rotary desiccant dryer on the first section of the common intake-air flow path, from which splitting point intake-air is diverged as regeneration-air along the common regeneration flow path;

wherein a purge sector and the regeneration sector of the first rotary desiccant dryer are arranged on the common regeneration-air flow path such that the regeneration-air first traverses the purge sector and subsequently the regeneration sector via a heater arranged on the common regeneration-air flow path between the purge sector and the regeneration sector;

-wherein the regeneration sector of the second rotary desiccant dryer is arranged subsequent to the regeneration sector of the first dryer on the common regeneration-air flow path, and where upstream on the common intake-air flow path and downstream on the common regeneration flow path from the second rotary desiccant dryer is arranged the third rotary desiccant dryer, where on the regeneration-air flow path between the second and the third rotary desiccant dryer is arranged an inter-heater for inter-heating regeneration-air prior to traversing the regeneration sector of the third rotary desiccant dryer;

the 3-rotor drying system further comprising a return-air flow path for providing return-air from the location of use to the mixing point for return air and one or more of pumps, bellows, or fans, wherein the 3-rotor drying system further comprises at least one filter arranged on the common intake-air flow path for removing airborne particles from the intake-air, and wherein the at least one filter comprises at least a first, a second and a third filter, each respective filter arranged downstream from a preceding respective third, second, and first rotary desiccant dryer in ascending order of filter class.

2. A 3-rotor drying system according to claim 1 further comprising a first cooler arranged on the intake-air flow path between the second and the third rotary desiccant dryers.

3. A 3-rotor drying system according to claim 1, further comprising a splitting point for mixed-air arranged between the mixing point for return-air and the first rotary desiccant dryer on a first section of the product-air flow path upstream from the first rotary desiccant dryer, from which splitting point mixed-air is diverged as regeneration-air to the common regeneration-air flow path via a mixed-air flow path.

4. A 3-rotor drying system according to claim 1, further comprising an inter-heater for inter-heating regeneration-air prior to traversing the regeneration sector of the second rotary desiccant dryer arranged on the common regeneration-air flow path between the first and the second rotary desiccant dryers.

5. A 3-rotor drying system according to claim 2, further comprising a second cooler arranged on the product-air flow path prior to the first rotary desiccant dryer.

6. A 3-rotor drying system according to claim 1, further comprising an inter-heater arranged on the product-air flow path downstream of the first rotary desiccant dryer.

7. A 3-rotor drying system according to claim 5, further comprising a third cooler arranged on the product-air flow path downstream of the first rotary desiccant dryer.

8. A 3-rotor drying system according to claim 1, wherein said initial rotary desiccant dryer removes at least 90% by weight of the initial moisture content comprised in said intake-air.

9. A 3-rotor drying system according to claim 1, wherein the dew point of the product-air is below −65° C.

10. A 3-rotor drying system according to claim 1, further comprising a pre-cooler for cooling intake-air to 15% above the dew point of the intake-air based on difference in degrees Celsius.

11. A 3-rotor drying system according to claim 1, further comprising a pretreatment unit for pretreating air to provide intake-air, said means arranged on the intake-air flow path prior to the initial rotary desiccant dryer.

12. A 3-rotor drying system according to claim 2, wherein said first cooler provides cooling from below 60° C. to between 15° C. to 25° C.

13. A 3-rotor drying system according to claim 1, wherein said first filter is a class F6 filter, said second filter is a filter selected from filter classes F6 to F9, and said third filter is a class F9 filter.

14. A 3-rotor drying system according to claim 1, further comprising a HEPA-filter arranged downstream from said third filter.

* * * * *